(12) United States Patent
Knapp

(10) Patent No.: US 6,336,640 B1
(45) Date of Patent: Jan. 8, 2002

(54) GASKET

(75) Inventor: Mark Knapp, Ravenna, OH (US)

(73) Assignee: Malcolm Mann Inc., Chagrin Falls, OH (US)

( * ) Notice: Subject to any disclaimer, the term of this patent is extended or adjusted under 35 U.S.C. 154(b) by 0 days.

(21) Appl. No.: 09/587,073

(22) Filed: Jun. 2, 2000

(51) Int. Cl.[7] .................................................. F16L 5/00
(52) U.S. Cl. ........................ 277/606; 277/616; 277/645
(58) Field of Search ................................. 277/605, 606, 277/615, 616, 626, 640, 641, 645

(56) References Cited

U.S. PATENT DOCUMENTS

| | | |
|---|---|---|
| 2,259,940 A | 10/1941 | Nathan |
| 3,031,200 A | 4/1962 | Hamer |
| 3,380,763 A | 4/1968 | Schmunk |
| 3,386,745 A * | 6/1968 | Hein .......................... 277/615 |
| 3,796,447 A | 3/1974 | de Putter |
| 3,813,107 A * | 5/1974 | Ditcher ........................ 277/605 |
| 3,865,386 A | 2/1975 | Wilke |
| 4,018,461 A | 4/1977 | Bram |
| 4,223,895 A | 9/1980 | Roberts, Jr. et al. |
| 4,298,206 A | 11/1981 | Kojima |
| 4,333,662 A | 6/1982 | Jones |
| 4,387,900 A | 6/1983 | Ditcher et al. |
| 4,487,421 A | 12/1984 | Housas et al. |
| 4,566,704 A | 1/1986 | Van Dongeren |
| 4,585,026 A | 4/1986 | Norton |
| 4,602,792 A | 7/1986 | Andrick |
| 4,641,858 A | 2/1987 | Roux |
| 4,702,502 A | 10/1987 | Shade et al. |
| 4,772,154 A | 9/1988 | Caroulle |
| 4,834,398 A | 5/1989 | Guzowski et al. |
| 5,058,907 A | 10/1991 | Percebois et al. |
| 5,067,751 A | 11/1991 | Walworth et al. |
| 5,114,162 A | 5/1992 | Ditcher |
| 5,143,381 A | 9/1992 | Temple |
| 5,324,083 A | 6/1994 | Vogelsang |
| 5,415,436 A | 5/1995 | Claes et al. |
| 5,687,976 A * | 11/1997 | Andrick et al. ......... 277/605 X |
| 5,988,695 A | 11/1999 | Corbett, Jr. |
| 6,126,173 A * | 10/2000 | Westholl et al. ............ 277/615 |

* cited by examiner

*Primary Examiner*—Robert J. Sandy
*Assistant Examiner*—Karlena D. Schwing

(57) ABSTRACT

A compressible annular gasket for providing a fluid-tight seal between a first tubular member having an annular groove and an adjacent ridge and a smooth annular section of a second tubular member when the first tubular member and the smooth annular section are in a relative surrounding and surrounded relationship. The compressible annular gasket includes an anchor portion adapted to be disposed in the annular groove and an elongated portion adapted to extend across the adjacent ridge when the anchor portion is disposed in an adjacent groove. The elongated portion makes contact with the annular section when the first tubular member and the smooth annular section are in a relative surrounded and surrounding relationship.

21 Claims, 3 Drawing Sheets

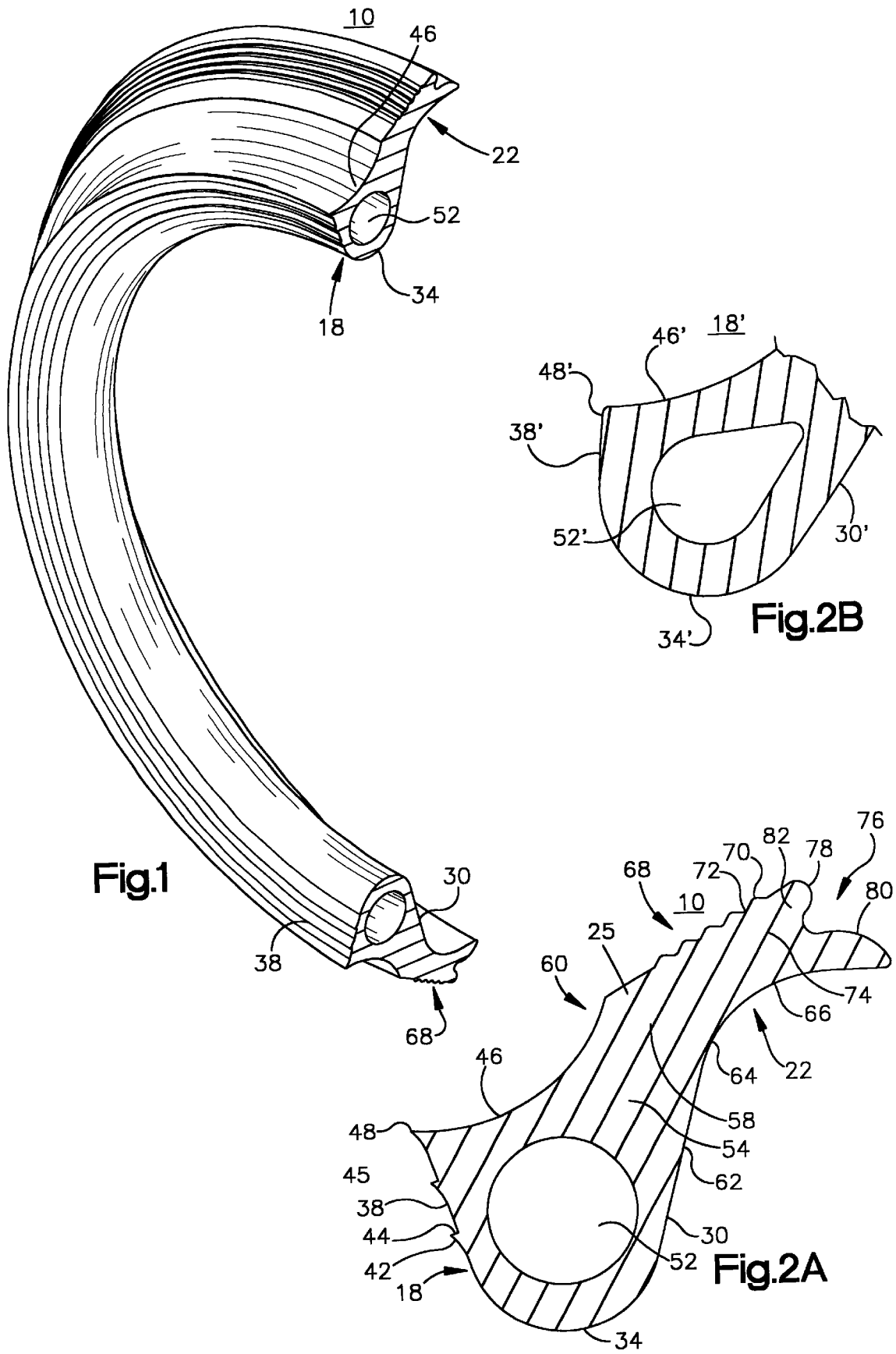

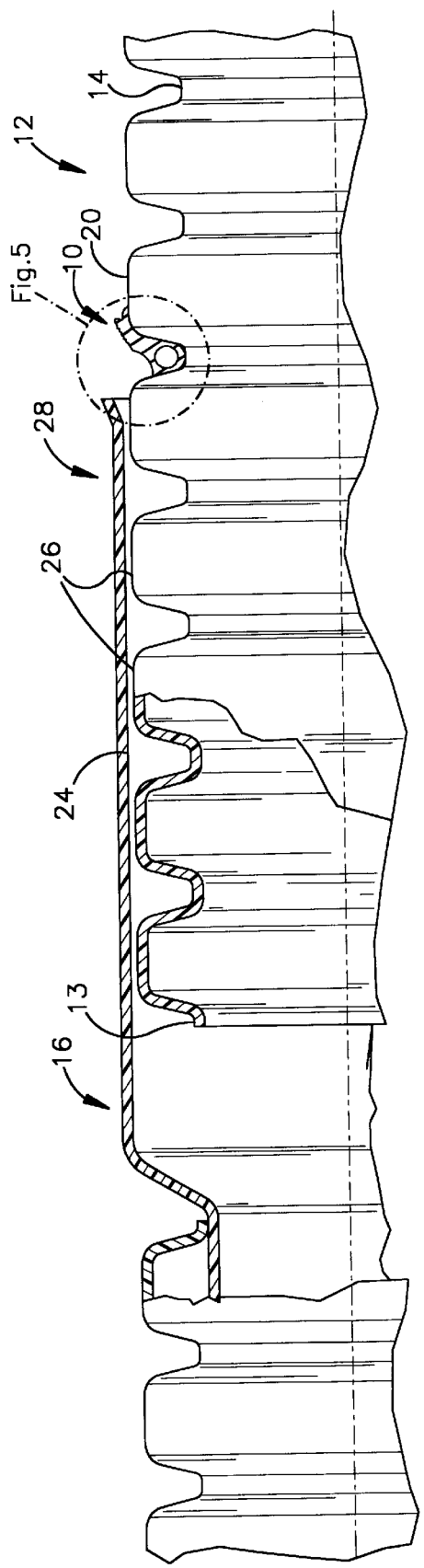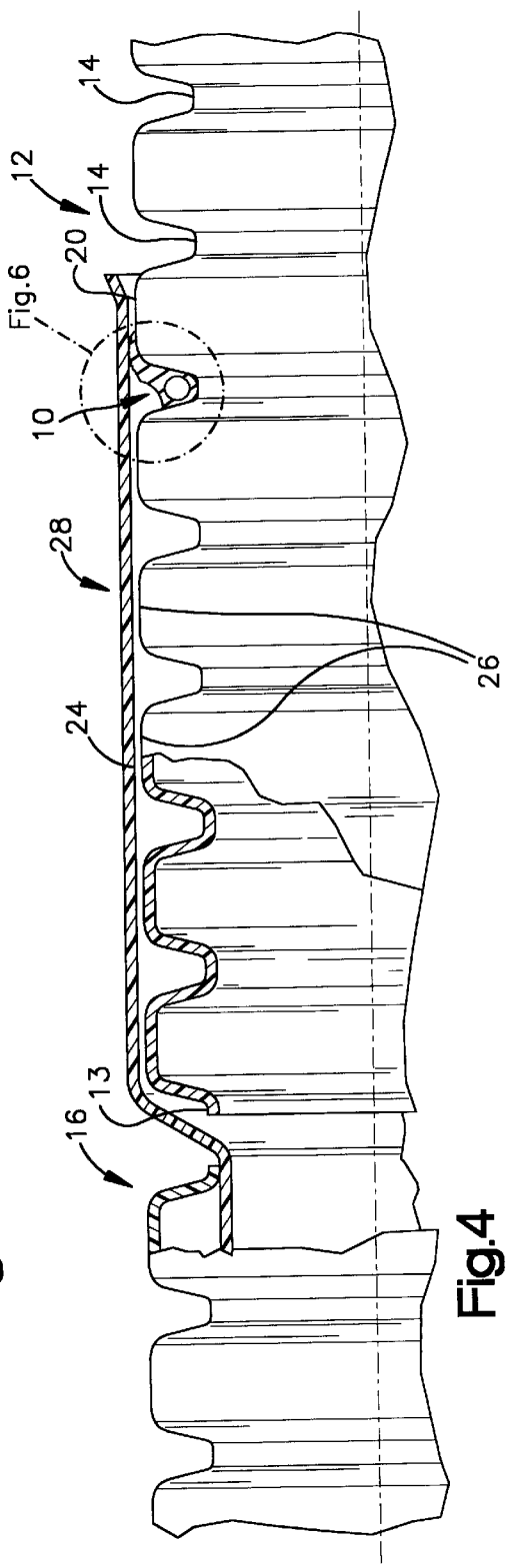

GASKET

TECHNICAL FIELD

The present invention relates to elastomeric gaskets and, more specifically, gaskets for providing a fluid tight seal between a pair of tubular members, particularly corrugated pipe.

BACKGROUND ART

It is well known to form a seal between two pipe sections where the end of one of the pipe sections has annular grooves and one of the pipe sections has an enlarged bell portion. An elastomeric gasket is placed around the end of the pipe section having annular grooves. The pipe section having annular grooves is inserted into an enlarged bell portion of a second pipe section.

Prior art gaskets are adapted to fit in the groove of a corrugated pipe. As one end of a pipe is pushed into the enlarged end of another pipe section, the gasket is sometimes pulled from the groove and the pipe is not properly sealed. When the pipe is not properly sealed ground water may leak into the pipe or fluid may leak out of the pipe and contaminate the ground.

U.S. Pat. No. 4,702,502 attempted to solve the problem where the gasket was pulled from the annular grooves of a corrugated pipe when the corrugated pipe was inserted into a bell portion of a second corrugated pipe. The '502 patent concerned a telescopic joint in low pressure corrugated plastic pipe. The joint includes a one piece elastomeric gasket that has a sealing portion adapted to be disposed in a groove in one of the pipes and an anchoring portion adapted to be disposed in an adjacent groove. As the pipes are telescoped together the anchoring portion is trapped in the groove and anchors the sealing portion in place as it is compressed.

Typically, the grooves of a corrugated pipe do not have a very tight tolerance. If a gasket rolls as the first and second pipe sections are assembled, a fluid tight seal may not result or the corrugated pipe could be damaged. A gasket is needed that can accommodate a corrugated pipe having grooves of a variety of sizes, does not roll as one pipe section is inserted into a second pipe section, and provides a wedging action to assure a tight seal under pressure.

DISCLOSURE OF INVENTION

The present invention relates to an improved compressible annular gasket for providing a fluid-tight seal between a first tubular member and a second tubular member. The first tubular member, such as a corrugated pipe, typically has a plurality of annular grooves and ridges. The second tubular member typically has a smooth annular section. The gasket of the present invention seals the two tubular members when an end of the first member is inserted into the smooth annular section of the second member. The compressible annular gasket comprises an anchor portion and an elongated portion. The anchor portion is sized to fit in one of the grooves of the corrugated pipe. In one embodiment, the anchor portion has a rounded external surface that is accommodated in a groove of the corrugated pipe, and one or more circumferential ridges extend from the anchor portion, serving to hold the bulbous portion in the groove of the corrugated pipe. The elongated portion extends axially of the tubular member from the anchor portion in a direction generally opposite from the ridge or ridges. When the anchor portion is installed in one of the grooves of the corrugated pipe, the elongated portion extends in a direction away from the open end of the pipe to which it is affixed and at least partially across an annular ridge of the corrugated pipe adjacent to the groove that receives the anchor portion. The elongated portion of the gasket makes sealing contact with the smooth annular section of the second pipe when the first tubular member and the smooth annular section of the second member are in a relative surrounded and surrounding relationship. The elongated portion is tapered, allowing the gasket to be pulled into increasingly tight engagement with the first and second tubular members as the smooth annular section is relatively moved onto the end of the first pipe and over the gasket.

In a broad aspect, the invention provides a compressible annular gasket for providing a fluid-tight seal between a first tubular member having an annular groove and a smooth annular section of a second member when the first tubular member and the smooth annular section are in a relative surrounded and surrounding relationship. The gasket includes an anchor portion adapted to be disposed in a groove and an elongated portion adapted to extend across an annular ridge when the anchor portion is disposed in a groove. The anchor portion includes an external surface sized to both fit in a groove and inhibit removal of the anchor portion from the groove. The elongated portion is adapted to extend axially from the anchor portion and make contact with an annular section when the tubular member having a groove in which the gasket is received and a smooth annular section are in relative surrounded and surrounding relationship.

Additional features of the invention will become apparent and a fuller understanding obtained from the following detailed description in connection with the accompanying drawings.

BRIEF DESCRIPTION OF DRAWINGS

FIG. 1 is a perspective view of a portion of the annular elastomeric gasket of the present invention;

FIG. 2A is a cross-section of the elastomeric gasket of one embodiment of the present invention;

FIG. 2B is a partial cross-section of the elastomeric gasket of another embodiment of the present invention;

FIG. 3 is a sectional view of an elastomeric gasket of the present invention installed on a corrugated pipe;

FIG. 4 is a sectional view of an elastomeric gasket of the present invention installed on a corrugated pipe and engaged by an enlarged end of a second pipe;

BEST MODE FOR CARRYING OUT THE INVENTION

Figure 5:
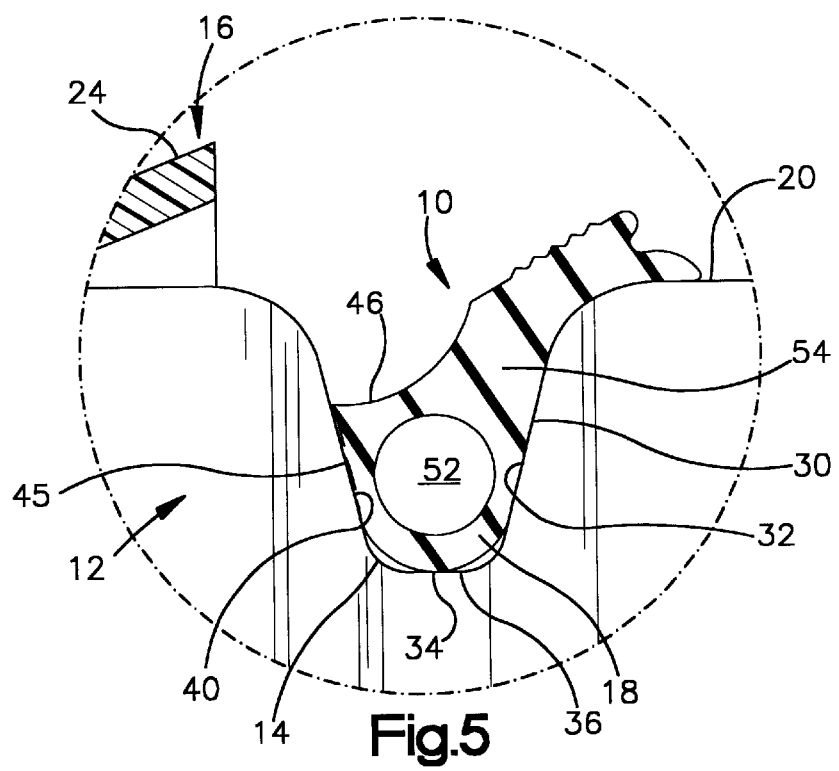
FIG. 5 is an enlarged fragmented view of FIG. 3.

Referring to the drawings, the present invention is directed to a compressible resilient, annular gasket 10 for providing a fluid-tight seal between a first tubular member 12 that has a plurality of annular grooves 14 and a second tubular member 16 that includes a smooth annular section 24. The compressible annular gasket 10 forms a seal between the first tubular member 12 and the second tubular member 16. When the first tubular member 12 is inserted into the second tubular member 16, the first tubular member 12 is surrounded by the smooth annular section 24 of the second tubular member. The compressible annular gasket includes an anchor portion 18 that anchors the compressible annular gasket 10 to the first tubular member 12 and an elongated portion 22 that forms a seal between the tubular members 12, 16. The anchor portion 18 is adapted to be disposed in one of the annular grooves 14, and is flexible enough to conform to grooves of varying sizes. The size of the anchor portion 18 prevents the gasket 10 from being pulled over a ridge 20 as the tubular members 12, 16 are assembled. The elongated portion 22 extends generally axially from the anchor portion 18 and gradually tapers down at portion 25 as it extends from the anchor portion 18. When the anchor portion 18 is pulled over an end 13 of the first tubular member and is inserted into an annular groove 14, the elongated portion extends in a direction away from the direction in which the member 12 will be inserted into the member 16, and across an adjacent annular ridge 20 of the first tubular member 12. The elongated portion 22 makes contact with a smooth annular section 24 of the second tubular member 16 when the second tubular member 16 is disposed around the first tubular member 12. The tapered portion 25 of the elongated portion 22 acts as a wedge, which creates a tight frictional engagement between the gasket and the first and second tubular members 12, 16 as they are assembled and holds the tubular member and the gasket in place once they are assembled.

Although the gasket 10 could be used to form a joint between metal, concrete or other tubular sections, it particularly well suited for use with corrugated plastic pipe. Typically, the first tubular member 12 is a plastic corrugated pipe having a plurality of annular grooves 14 and a plurality of annular ridges 26 and the second tubular member 16 is a corrugated pipe having an integral bell or enlarged end 28 that is not corrugated.

FIGS. 1 and 2A show a cross-section of an exemplary compressible annular gasket 10. The anchor portion 18 is adapted to be inserted into one of the grooves 14 of the first tubular member 12. The anchor portion 18 includes a first relatively flat surface 30 that engages a first side 32 of an annular groove 14, shown in FIG. 6. At the bottom of the anchor portion 18 is a rounded surface 34 that generally conforms to a valley 36 of an annular groove 14 also shown in FIG. 6. The anchor portion 18 of the embodiment shown includes a jagged surface 38 that contacts a second side 40 of an annular groove 14 also shown in FIG. 6. The jagged surface 38 is comprised of circumferential line segments that include gradually outward sloped walls 42 and abruptly inward sloped walls 44. The inward tapering walls 44 form points with the outward sloped walls 42 to form one or more ridges 45. The ridges 45 are spaced apart to form the jagged surface 38.

Figure 6:
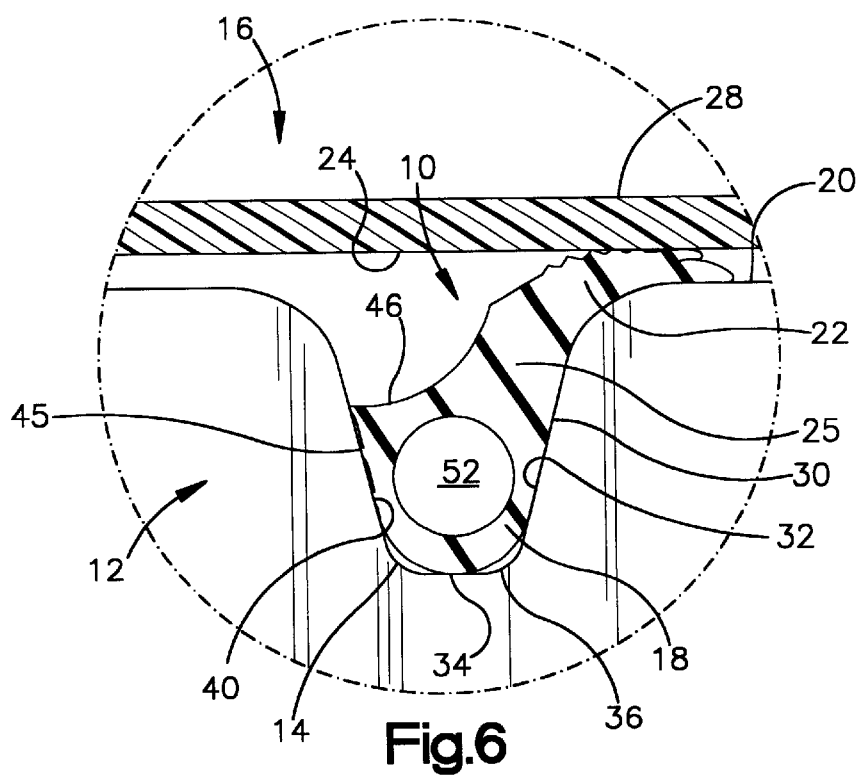
FIG. 6 is an enlarged fragmented view of FIG. 4.

Referring to FIG. 6, the ridges 45 deform as the gasket 10 is pulled over the end 13 of the first tubular member 12 and is inserted into an annular groove 14 to provide multiple points of contact. The deformable ridges 45 anchor the compressible annular gasket 10 in an annular groove 14. The deformable ridges 45 also accommodate tolerance in the annular grooves 14 of the tubular member 12, by expanding or collapsing to conform to the shape of the groove 14.

The top 46 of the anchor portion 18 of the embodiment shown in FIG. 2A is a relatively shallow concave surface, but could be substantially more planar. A concave top 46 reduces the amount of material needed to form the gasket 10, but the top can be in other configurations, as long as the top 46 does not extend significantly from the groove in the tubular member. The top 46 intersects the jagged outer surface 38 to form a final point 48 on the jagged outer surface 38. Referring to FIGS. 3–6, the top 46 of the anchor portion 18 is below the annular ridges of the first tubular member 12, when the gasket 10 is installed on the first tubular member 12. As the first and second tubular members 12, 16 are assembled, the bell portion or enlarged end 28 of the second tubular member 16 passes over the anchor portion 18, without engaging the anchor portion 18.

The anchor portion of the embodiment shown in FIG. 2A includes a internal circumferential passage 52 that extends through the compressible annular gasket 10. While not necessary where the gasket material is adequately compressible, the internal circumferential passage provides several significant advantages. The internal circumferential passage 52 reduces the amount of material needed to form the compressible annular gasket 10. Additionally, the internal circumferential passage 52 further adapts the anchor portion 18 to anchor the compressible gasket 10 to a corrugated pipe and to accommodate annular grooves 14 of varying sizes, by increasing the flexibility of the anchor portion without requiring the gasket material to be as compressible. The internal circumferential passage 52 also assures that the anchor portion 18 can be pushed entirely into the annual groove 14.

While the embodiment of FIGS. 2 and 2B are preferred and have advantages, it should be readily understood that a variety of shapes and sizes of anchor portions can be used. A gasket 10 having any size or shape anchor portion can be constructed, so long as the anchor portion is small enough to fit within an annular groove 14 and is large enough to prevent the gasket from being pulled over the adjacent annular ridge 20 of the first tubular member as the tubular members are assembled. The anchor portion 18 can be round, polygonal, elliptical, trapezoidal, or any other shape.

A second embodiment of the invention has an anchor portion 18' as shown in FIG. 2B. In the embodiment shown in FIG. 2B, the remainder of the gasket is the same as the embodiment shown in FIG. 2A. The anchor portion 18' is adapted to be inserted into one of the grooves 14 of the first tubular member 12. The anchor portion 18' includes a first relatively flat surface 30' that engages a first side 32 of an annular groove 14. At the bottom of the anchor portion 18' is a rounded surface 34' that generally conforms to a valley 36 of an annular groove 14. The anchor portion 18' of the embodiment shown in FIG. 2B includes a second relatively flat surface 38' that contacts a second side 40 of an annular groove 14.

The anchor 18' deforms as the gasket 10 is pulled over the end 13 of the first tubular member 12 and is inserted into an annular groove 14. The deformation and resilience of the anchor 18' anchors the compressible annular gasket 10 in an annular groove 14. The deformability of the anchor 18' accommodates tolerance in the annular grooves 14 of the tubular member 12, by expanding or collapsing to conform to the shape of the groove 14.

The top 46' of the anchor portion 18' of the embodiment shown in FIG. 2B is a shallow concave surface, but could be substantially more planar. A concave top 46' reduces the amount of material needed to form the gasket 10, but the top can be in other configurations, as long as the top 46' does not extend significantly from the groove in the tubular member. The top 46' intersects the second relatively flat surface 38' to form a circumferential line or ridge 48' at the top 46' of the anchor 18'. The top 46' of the anchor portion 18' is below the annular ridges of the first tubular member 12, when the gasket 10 is installed on the first tubular member 12. As the first and second tubular members 12, 16 are assembled, the bell portion or enlarged end 28 of the second tubular member 16 passes over the anchor portion 18', without engaging the anchor portion 18'.

The anchor portion of the embodiment shown in FIG. 2B includes an internal circumferential passage 52' that extends through the compressible annular gasket 10. In the exemplary embodiment, the internal circumferential passage 52' is formed in the general shape of a "teardrop." While not necessary where the gasket material is adequately compressible, the internal circumferential passage provides several significant advantages. The internal circumferential passage 52' reduces the amount of material needed to form the compressible annular gasket 10. The "teardrop" shape of the internal circumferential passage shown in FIG. 2B helps to minimize the amount of material needed to form the gasket 10. Additionally, the internal circumferential passage 52' adapts the anchor portion 18' to anchor the compressible gasket 10 to corrugated pipe and to accommodate annular grooves 14 of varying sizes, by increasing the flexibility of the anchor portion without requiring the gasket material to be as compressible. The internal circumferential passage 52' also assures that the anchor portion 18' can be pushed entirely into the annual groove 14.

In the exemplary embodiments, the elongated portion includes a tapered portion 54 that connects the elongated portion 22 to the anchor portion 18. The tapered portion 54 gradually narrows as it extends from the anchor portion 18 to the elongated portion 22. In the exemplary embodiments, the top 60 of the tapered portion is a shallow concave surface, but can be planar, and extends at an incline from the top 46 of the anchor portion 18. The bottom of the tapered portion 54 extends from and forms a part of the relatively flat surface 30 of the anchor portion 18. In the exemplary embodiment, a concave curvature 64 is formed between a tail portion 76 and the relatively flat surface 30 of the anchor portion 18.

Referring to FIGS. 5 and 6, when the compressible annular gasket 10 is installed in an annular groove 14 of the first tubular member 12 the tapered portion 54 extends nearly to the top of the grooves 14. As the enlarged end 28 is inserted over the first tubular member 12 the smooth annular section 24 of the second tubular member 16 clears or slightly engages the top surface 60 of the tapered portion 54. The bottom of the tapered portion pushes against the second side 32 of a groove 14 in which the anchor portion is located as the first and second tubular members 12, 16 are assembled. The engagement of the tapered portion 54 against the second side 32 of the groove 14 inhibits the anchor portion 18 from being pulled from the groove 14.

Referring to FIG. 2A, the elongated portion 22 continues to extend from the tapered portion 54. The thickness of the elongated portion 22 continues to slightly taper as the elongated portion 22 extends from the tapered portion 54. The bottom 66 of the elongated portion is a concave, curved surface 64 that extends from the bottom 62 of the tapered portion 54. The curved surface 64 of the elongated portion conforms to the annular ridge 20 adjacent to the groove in which the anchor portion is received. The outer surface 68 of the elongated portion extends away from the outer surface of the tapered portion 60 at an obtuse angle. The outer surface 68 of the elongated portion is annular and relatively flat, but includes one or more annular ribs 70, five being provided in the embodiment shown. When viewing the cross-section of the compressible gasket 10 the annular ribs 70 resemble round bumps. Between each annular ridge 70 is a valley 72.

The annular ribs 70 on the elongated portion contact the smooth annular section 24 of the second tubular member 16 when the first and second tubular members 12, 16 are brought into engagement and deform to provide a series of spaced seals. The bottom surface 66 of the elongated portion 22 conforms to one of the ridges 22 of the first tubular member 12. Compression of the elongated portion 22 by the surrounding bell 71 causes the top surface 68 and bottom surface 66 of the elongated portion 22 to tightly press against the first and second tubular members 12, 16 to form a fluid tight seal therebetween.

The engagement of the elongated portion 22 will tend to partially pull the anchor portion from the groove as the first and second tubular members 12, 16 are assembled. The gradually tapered end portion 25 of the elongated portion forms a tighter seal when more of the elongated portion 22 is pulled and wedged between the annular ridge 20 of the first tubular member 12 and the smooth annular section 24 of the second tubular member 16. The anchor portion 18 prevents the gasket 10 from rolling or from being pulled over the ridge 20, because the anchor portion is too large to pass between ridge 20 of the first tubular member 12 and the smooth annular section 24 of the second tubular member 16.

In the exemplary embodiments, a tail portion 76 is formed at the end 74 of the elongated portion. The tail 76 is defined by a generally sinusoidal surface 78 and an arched surface 80. The sinusoidal surface 78 continues from the top surface of the elongated portion 68, and curves inward to form a round convex end at the end 74 of the elongated portion and curves outward to form a valley in the tail portion 76. The arched surface connects the sinusoidal surface 78 to the bottom 66 of the elongated portion to form a narrow portion 82 of the tail 76. The narrow portion 82 of the tail 76 is the leading edge of the gasket that centers the first and second tubular members 12, 16 as they are assembled. When pressure is applied to the annular ribs 70 on top of the elongated portion 68 the tail portion 76 deforms to accommodate the enlarged bell 28 of the second tubular member.

A variety of natural or synthetic rubbers such as isoprene or ethylene propylene diene monomer (EPDM) could be used as the gasket material. The preferred durometer range of the gasket material is 40 to 60. In the exemplary embodiments, the gaskets are made from 50 Duro Polyisoprene per ASTM F-477-LH.

The gasket can be made by extruding a length of gasket material and connecting its ends together by gluing or vulcanization. The annular gasket can also be molded to eliminate the step of connecting the gasket ends. The gasket 10 can also be made with two different materials having different durometers. For example the elongated portion 22 may be more elastic than the remainder of the gasket 10, allowing the more rigid portion of the gasket to lock the gasket in place. On example of this type of construction is found in applicant's provisional patent application Ser. No. 60/168,052 entitled "HDPE Pipe-Locking Ring with Gasket," which is herein incorporated by reference.

It will be understood that various modifications can be made without departing from the spirit and scope of the invention.

I claim:

1. A compressible annular gasket for providing a fluid-tight seal between a corrugated pipe having an annular groove and an adjacent ridge, and a smooth annular section of a second member, when the corrugated pipe and the section are in relative surrounded and surrounding relationship, comprising:

a) an anchor portion shaped to conform to a groove in a corrugated pipe, said anchor portion accommodating insertion into said groove and being large enough to prevent said anchor portion from being pulled between an annular ridge of said corrugated pipe and a smooth annular section when said corrugated pipe and said annular section are in relative surrounded and surrounding relationship; and, b) an elongated portion extending from said anchor portion and adapted to extend only partially across said annular ridge when the anchor portion is disposed in said groove, said elongated portion being adapted to make sealing contact with said annular section when said corrugated pipe having said groove in which the gasket is received and said smooth annular section are in relative surrounded and surrounding relationship.

2. The compressible gasket of claim 1 further comprising an internal circumferential passage in said anchor portion.

3. The compressible gasket of claim 1 further comprising a plurality of radially projecting surfaces extending circumferentially from said elongated portion.

4. The compressible gasket of claim 1 wherein said elongated portion includes a concave peripheral surface portion adapted to at least partially conform to a surface portion of said ridge.

5. The compressible gasket of claim 1 further comprising a tail portion extending from said elongated portion, adapted to contact a first tubular member and an annular section when the first tubular member and the smooth annular section are in relative surrounded and surrounding relationship.

6. The compressible gasket of claim 1 wherein said gasket is made from two materials having different durometers, said elongated portion being formed from a more elastic material than said anchor portion.

7. The compressible gasket of claim 1 further comprising a circumferential ridge extending from the anchor portion, adapted to inhibit removal of the anchor portion from the groove.

8. The compressible gasket of claim 1, further comprising a tapered portion having a wide end which communicates with said anchor portion and a narrow end which communicates with said elongated portion.

9. A compressible annular gasket for providing a fluid-tight seal between a corrugated pipe having an annular groove and an adjacent ridge and a smooth annular section of a second member when the corrugated pipe and the section are in a relative surrounded and surrounding relationship, comprising:

a) an anchor portion shaped to conform to a groove of a corrugated pipe; and b) an elongated portion extending axially from said anchor portion and shaped to extend only partially across and conform to an annular ridge of said corrugated pipe when the anchor portion is disposed in an adjacent groove.

10. The compressible gasket of claim 9 further comprising an internal circumferential passage in said anchor portion.

11. The compressible gasket of claim 9 further comprising a circumferential ridge extending from the anchor portion, adapted to inhibit removal of the anchor portion from said groove.

12. The compressible gasket of claim 9 wherein said elongated portion includes a concave peripheral surface portion adapted to at least partially conform to a surface portion of one of such ridges.

13. The compressible annular gasket of claim 12 wherein said elongated portion includes a plurality of radially projecting surfaces extending circumferentially sized to make contact with said annular section when said corrugated pipe and said smooth annular section are in relative surrounded and surrounding relationship.

14. The compressible gasket of claim 9 further comprising a tail portion extending from said elongated portion, adapted to contact a first tubular member and an annular section when the first tubular member and the smooth annular section are in relative surrounded and surrounding relationship.

15. The compressible gasket of claim 9 wherein said gasket is made from two materials having different durometers, said elongated portion being formed from a more elastic material than said anchor portion.

16. The compressible annular gasket of claim 9 wherein said elongated portion is tapered.

17. The compressible annular gasket of claim 9, further comprising a tapered portion having a wide end which communicates with said anchor portion and a narrow end which communicates with an elongated portion.

18. A fluid tight corrugated pipe coupling, comprising:

a) a corrugated pipe having an annular groove and an annular ridge;

b) an annular section having a smooth inner surface disposed around said corrugated pipe;

c) an annular gasket disposed between said corrugated pipe and said annular section, said annular gas including an anchor portion shaped to conform to said annular groove an an elongated portion extending from said groove only partially over a radially outer surface of said annular ridge; said elongated portion contacts said radially outer surface and the smooth annular section to form a fluid tight seal between the corrugated pipe and the annular section.

19. The compressible gasket of claim 18 wherein said gasket is made from two materials having different durometers, said elongated portion being formed from a more elastic material than said anchor portion.

20. A method of providing a fluid tight seal between a corrugated pipe and a smooth inner surface of an annular section, comprising:

a) inserting an anchor portion of a gasket into a groove of a corrugated pipe;

b) positioning an elongated portion of said gasket only partially over a radially outer surface of an adjacent ridge of said corrugated pipe;

c) inserting said corrugated pipe into a smooth annular section having a smooth inner surface;

d) inhibiting said gasket from being pulled over said adjacent ridge by engaging said corrugated pipe and said section with said anchor portion; and e) contacting said radially outer surface of said ridge and said smooth inner surface with said elongated portion to provide a fluid tight seal between said corrugated pipe and said smooth inner section.

21. The compressible gasket of claim 20 wherein said gasket is made from two materials having different durometers, said elongated portion being formed from a more elastic material than said anchor portion.

* * * * *